Nov. 4, 1930.  R. A. FURLONG  1,780,227
CARD INDEX SYSTEM
Filed Aug. 6, 1927   4 Sheets-Sheet 1
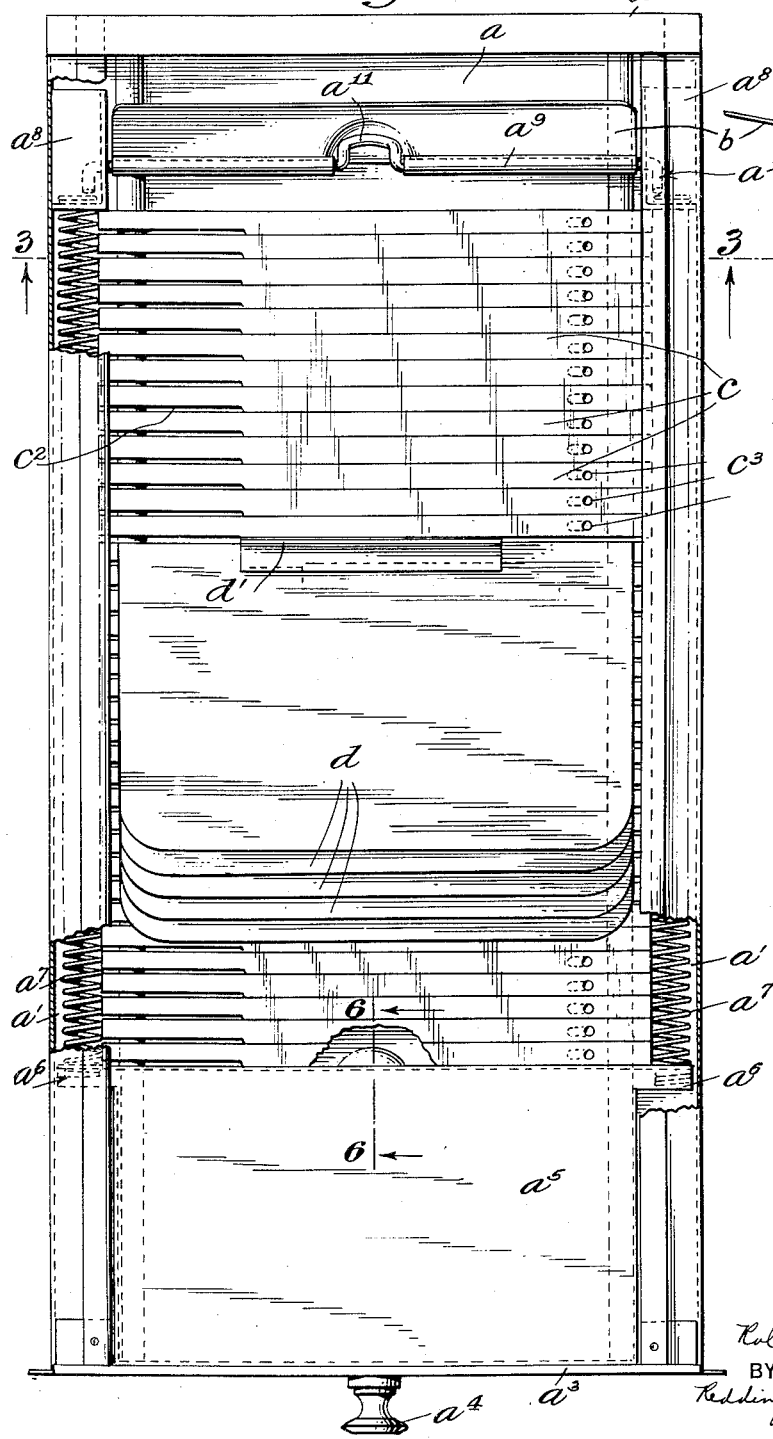
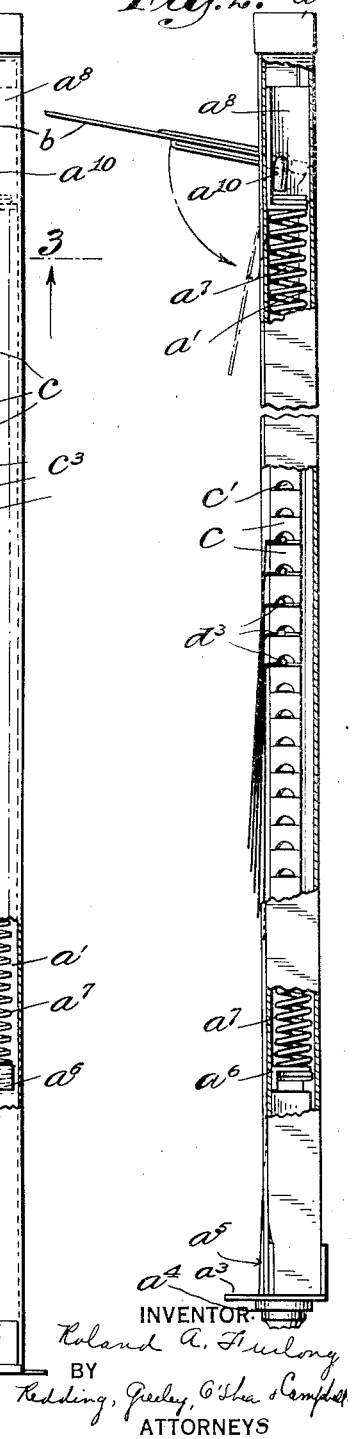
INVENTOR
Roland A. Furlong
BY
Redding, Greeley, O'Shea & Campbell
ATTORNEYS Nov. 4, 1930.     R. A. FURLONG     1,780,227
CARD INDEX SYSTEM
Filed Aug. 6, 1927     4 Sheets-Sheet 2

INVENTOR:
Roland A. Furlong,
BY Redding, Greeley, O'Shea & Campbell
his ATTORNEYS.

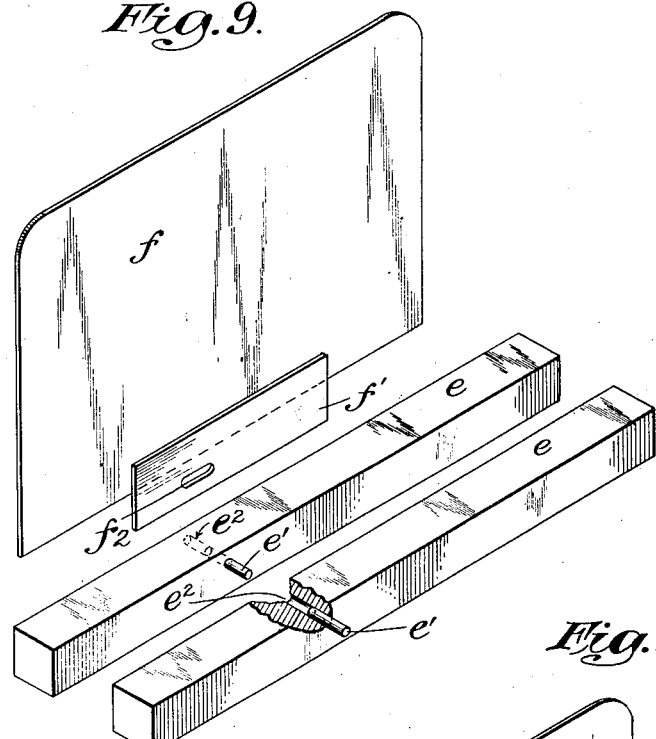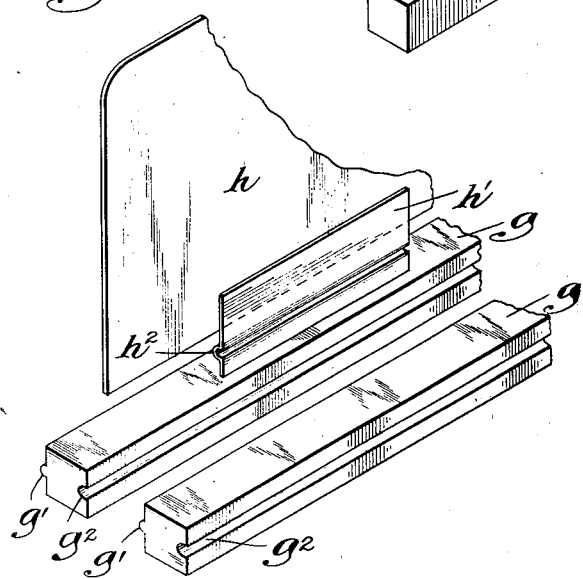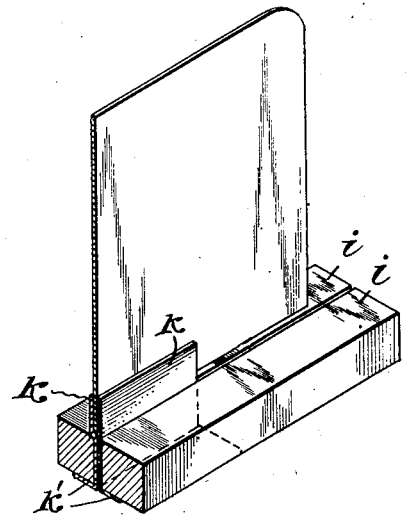

Inventor:
Roland A. Furlong
By his Attorneys
Redding, Greeley, O'Shea & Campbell Patented Nov. 4, 1930

1,780,227

UNITED STATES PATENT OFFICE

ROLAND A. FURLONG, OF ROCHESTER, NEW YORK, ASSIGNOR TO THE YAWMAN & ERBE MANUFACTURING COMPANY, OF ROCHESTER, NEW YORK, A CORPORATION OF NEW YORK

CARD-INDEX SYSTEM

Application filed August 6, 1927. Serial No. 211,024.

The desirability of maintaining an accurate and convenient file of data in the form of a digest, compilation or other indexed matter has stimulated considerable activity in this field, particularly in the recent years which have been marked by highly organized business methods, and many forms of such files have been designed in an effort to satisfy the requirements of such service.

The fundamental factors which require the cards constituting the file to be readily replaceable and interchangeable so that growth or decrease thereof may be accommodated, the means upon the cards by which they are secured in the file to be constructed so as not to injure a typewriter in order that they may be filled out with great ease, and their construction standardized and simplified, are of great importance. With these qualifications in view, files have been designed, and are now in use, embodying features which render the individual cards more serviceable and easily used, but there remain other disadvantages which have not been overcome.

The present invention has for an object, therefore, to provide a file adapted to be used with great ease and having cards which are readily inserted and removed and held in place securely.

More particularly, the invention has for an object the provision of a card for files of the above character having a means which enables them to be securely held in the files while possessing the quality of being capable of insertion therein with great ease and yet possessing no portions which would prevent them from being run through a typewriter.

The invention further contemplates providing a file structure which enables the cards to be removed with great facility and to be locked in the file when inserted, thus preventing loss or accidental removal thereof.

Reference will now be had to the accompanying drawings for a more detailed description of the invention, wherein:

Figure 1 is a front elevation, partly broken away and in section, of a tray for holding file cards provided with the means for securing the cards in accordance with a preferred form of the present invention.

Figure 2 is an end elevation, partly broken away and in section, of the tray shown in Figure 1.

Figure 9 is a perspective view showing a modified form of spacer bar and hinge for securing the cards in the tray.

Figure 10 shows a further modification of such securing means.

Figure 11 shows a still further modified form of the invention wherein an additional manner of securing the cards is shown.

Referring particularly to Figures 1 and 2, $a$ indicates a suitable tray provided with longitudinally extending channels $a'$ at either side thereof. These channels may be formed by turning back the sides of the tray $a$ so that the edges of such turned-back portions lie in a plane which is parallel to the plane of the tray. An end cap, or backing $a^2$ is adapted to be secured at the rear of the tray and a front panel $a^3$, with finger pull $a^4$ forms the front end thereof. These portions may be secured together by pressing, riveting or by other well-known means, the specific manner of constructing the tray forming no part of the present invention. A plate $a^5$ is secured in the forward portion of the tray between the side channels and is positioned so that its top surface slopes upwardly from its rear edge to form a suitable bearing surface for the bottom card as it would normally lie in its hinged position.

Plate $a^5$ is provided with laterally extending arms $a^6$ which are received within the side channels $a'$ and serve to anchor springs $a^7$ lying within the channels. Rearwardly of the tray, and within side channels $a'$ are blocks $a^8$ to which are secured the other ends of the spring $a^7$. It is obvious that movement of the blocks rearwardly tensions springs $a^7$, and in this manner, the contents of the tray will be held, releasably, in position.

In order that the bars may be locked in a desired position, a lateral shaft $a^9$ is journaled, at either end, in these blocks and provided with downwardly extending arms $a^{10}$. The center of shaft $a^9$ may be turned up as at $a^{11}$ to form a suitable handle so that when it is laid against the top spacer bars, as shown in dotted lines in Figure 2, the arms $a^{10}$ are moved into engagement with the bottoms of the side channels to provide an eccentric lock for the blocks, a metallic top card $b$ is hinged to the shaft $a^9$. Before the latter can be moved to accommodate the insertion or removal of cards the handle $a^{11}$ must necessarily be raised to release such lock.

Figure 3:
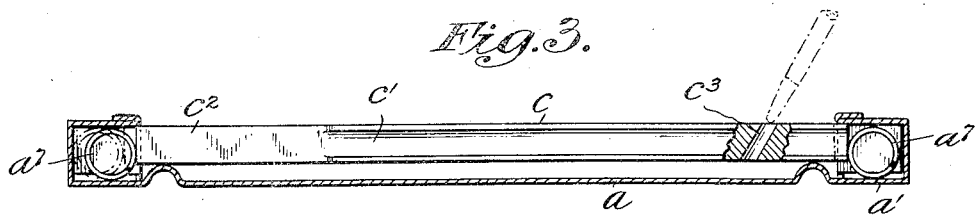
Figure 3 is a section taken on line 3—3 of Figure 1 and looking in the direction of the arrows.
Figure 4:
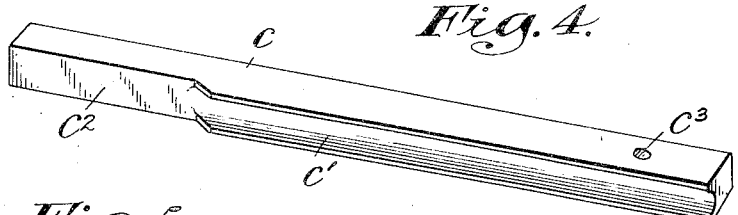
Figure 4 is a perspective view of a spacer bar made in accordance with the present invention.
Figure 5:
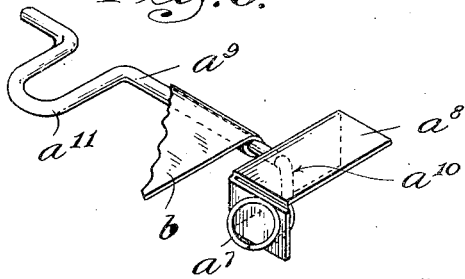
Figure 5 is a perspective view showing, in greater detail, the means for locking the bars in assembled position.

Between the plate $a^5$ and blocks $a^8$, space bars $c$ are inserted. These bars being shorter than the width of the tray and movable transversely thereof, may be formed with a longitudinal groove $c'$ in one side thereof and may be recessed at one end, as at $c^2$ to facilitate the spreading of the bars within the tray to aid in inserting the hinge or card holder which secures the card in place. Since the end of the hinge on the card may be inserted in the recess and the entire hinge thus threaded into the groove, the insertion of a card in the tray is greatly facilitated. From the upper face of each bar, an inclined or vertical recess $c^3$ is formed to receive a stylus, nail, or pencil and permit the bars to be removed from the tray quite readily by displacing laterally and lifting. In Figure 3 a stylus is represented in dot and dash lines and it will be quite evident that, by means of this construction, the bars may be moved quite readily.

Figure 6:
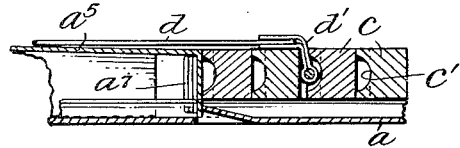
Figure 6 is a section taken on line 6—6 of Figure 1 and looking in the direction of the arrows.
Figure 7:
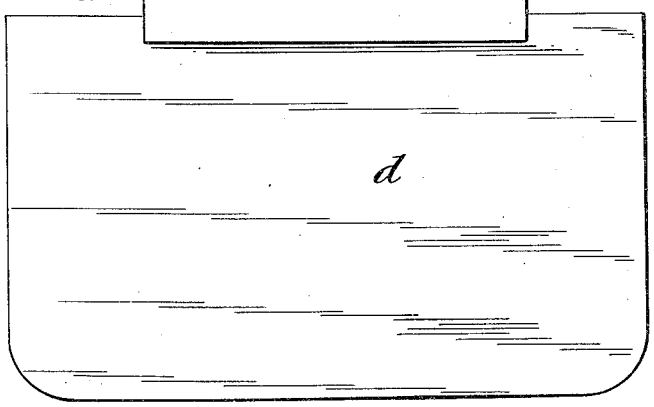
Figure 7 is an elevation of a form of card provided with a hinge and associated means for securing it in the tray.
Figure 8:
Figure 8 is an end view of the card shown in Figure 7, the hinge construction being shown more clearly.

The cards $d$ are formed with suitable hinges or holders $d'$ each of which has an enlarged securing portion $d^2$. This construction may comprise a gum tape secured at its edges to the top of the card, and having a cord $d^3$ or other suitable material carried within its folded portion. If desired, the hinge may be stitched as at $d^4$. Figure 6 illustrates the manner in which the card is secured in the tray, a portion of the holder including the enlarged end portion thereof being secured between adjacent space bars $c$. When the handle $a^{11}$ is raised and the lock released as above and the blocks $a^8$ able to slide, the springs $a^7$ hold the space bars $c$ in intimate relationship, and a stylus, or other instrument, may be inserted in the recesses $c^3$ and the space bars $c$ may be displaced laterally until the ends thereof clear the channels and lifted out of the tray. Removing one bar in this manner does not affect the rest since the coil springs $a^7$ close the bars in on one another immediately upon the removal of the bar in question. It will be apparent that the card having its hinge or holder carried in the groove of such bar will be removed together therewith. When a card is to be inserted, adjacent bars are separated by inserting the fingers or a flat instrument, such as a coin or knife blade into one of the recessed portions $c^2$ of the space bars and the card hinge inserted in the groove. When the bars again move together, the card will be held in position.

In the modification shown in Figure 9, adjacent space bars are adapted to secure the cards in the following manner. A suitable pin $e'$ is secured on one side of each bar $e$, the opposite sides of such bars being provided with recesses $e^2$ which are positioned to receive the pins $e'$ of the adjacent bars. The cards $f$ are provided with hinges $f'$ which are in turn formed with elongated holes $f^2$ to receive pins $e'$. In this manner, the cards are secured quite positively in the file and may be readily removed.

Figure 10 shows a further modified form wherein the bars $g$ are formed with tongues $g'$ and grooves $g^2$ on opposed sides. The hinges $h'$ which are to be used with this form of bar are formed with longitudinal channels $h^2$ which lie between the tongue and groove of adjacent bars. This causes an interengagement which enables the cards to be removed with great facility and at the same time secure them quite positively in the tray when the bars are closed together.

The modified form shown in Figure 11 includes space bars $i$ of solid rectangular form. The hinges $k$ of the cards to be used in connection with these bars are provided at their lowest edges with relatively rigid leaves $k'$ secured thereto in T-relation which are adapted to lie under adjacent bars $i$, the web of such hinge lying between the bars. This modification serves to illustrate an additional manner of securing the cards between the space bars and it will be obvious that such cards can be used in connection with any of the above forms of space bars.

Figure 12:
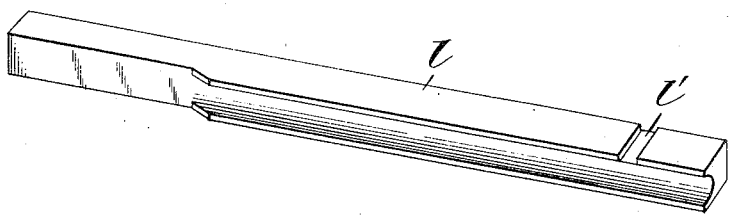
Figure 12 is a perspective view showing a modified form of space bar.

In Figure 12 a modified form of bar is shown in which the bar $l$ is provided with a slot $l'$ transverse to the axis of the bar. This serves in lieu of recess $c^3$ in the bar $c$ to facilitate the removal of the bar from the tray, since the finger nail or any other flat object can be used to dislodge and remove the bar by shifting it laterally until the end thereof clears the channel and then lifting.

Figure 13:
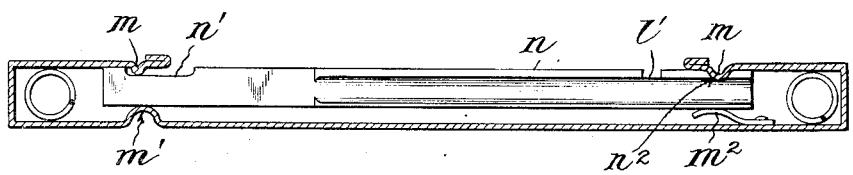
Figure 13 is a side elevation showing a still further modification of the space bar shown in Figures 1 and 2.
Figure 14:
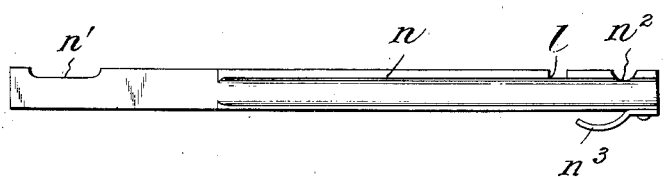
Figure 14 is a view in elevation showing a space bar constructed generally in accordance with the space bar shown in Figure 13, but provided with a spring on its under side.

Figures 13 and 14 are directed to a modified structure wherein beads $m$ are stamped downwardly in the turned-back portions of the tray and the space bar $n$ is provided with an elongated notch $n'$ at one end to engage one of the beads $m$ and a shorter notch $n^2$ at the other end to engage the other bead. A ridge $m'$ is pressed upwardly in the bottom of the tray and serves to maintain the bar more securely in position. When a bar is to be inserted, the end thereof having the elongated notch is inserted under the left hand turned-back portion of the tray and the bead $m$ thereon engaged the notch $n'$. The bar is pushed to the left (which motion is permitted by the length of the notch $n'$) until the other end clears the edge of the other turned-back portion, at which time it is inserted thereunder and the right hand bead $m$ and notch $n^2$ permitted to engage. A suitable leaf spring $m^2$, extending the length of the tray to engage all of the bars, is secured to the tray and urges the bars into engagement with the right-hand bead $m$ and the usual slot or recess $l'$ may be provided to facilitate the removal of the bars. Instead of providing the tray with a spring $m^2$ as shown in Figure 13, each space bar may be manufactured with a spring secured thereto as shown at $n^3$ in Figure 14. The bars may be made of wood or metal, as convenience and service dictate and the spring secured thereto in any suitable fashion. These ridges, springs, or equivalent structure facilitate the removal of the bars since they may be moved transversely of the tray until one end clears its corresponding flange on the tray, and the opposite end thereof depressed, thereby throwing such free end of the bar upwardly.

It will be apparent that the bars which have been described above may be made in many forms, either of rectangular or polygonal cross-section, or of circular cross-section. In the latter case, as in many other forms, no longitudinal groove in the bar would be necessary.

The hinge, in the form described, is of a non-metallic construction and is self-embodied with the cards, the entire forming a unitary construction which may be run through a typewriter without injury thereof. Obviously, the hinge or holder could be of a metallic construction if desired, and other forms may be employed which would be the full equivalent of the above hinge and contemplated by the invention described herein. The camming action of the locking arms $a^{10}$ against the bottom of the side channels holds the space bars and cards against displacement once such elements have been set in parallelism. In the form shown, the lock is not disturbed when the top card is thrown back. It is obvious that the lock bar may be formed as a part of the top card, in which case arms formed thereon would serve as pintles, being journaled within the blocks $a^8$. In this manner this element would serve as a lock for the spacer bars, a pintle for the top card, and an anchorage for the springs.

While the invention has been described particularly in connection with the drawings forming a part hereof, it is not to be limited, save as defined by the appended claims.

What I claim is:

1. In an apparatus of the class described, a tray, space bars carried thereby, means to engage an end bar to hold the bars together, an arm carried by the means, and means to move the arm into engagement with the tray to lock the first means in a desired position.

2. In an apparatus of the class described, a tray, space bars carried thereby, means to engage an end bar to hold the bars together, a lock shaft carried by the means, an arm carried by the shaft, and means to move the shaft to engage the arm with the tray to lock the first means in a desired position.

3. In an apparatus of the class described, a tray, space bars carried thereby, journal blocks carried by the tray and adapted to engage an end bar to hold the bars together, locking arms carried rotatably by the blocks, and means to move the arms into engagement with the tray to lock the blocks and arms in a desired position.

4. In an apparatus of the class described, a tray, space bars carried thereby, journal blocks carried by the tray and adapted to engage an end bar to hold the bars together, a shaft carried by the blocks, arms on the respective ends of the shaft and a handle on the shaft to move the arms into engagement with the tray to lock the blocks and arms in a desired position.

5. In an apparatus of the class described, in combination, a tray, cards to be carried thereby having securing means and space bars for the tray comprising parallel bars adapted to lie in the tray and formed with opposed sides adapted to engage and hold the securing means.

6. In an apparatus of the class described, in combination, a tray, cards to be carried thereby having securing means, space bars for the tray comprising parallel bars adapted to lie in the tray, and means on the bars to engage and hold the securing means.

7. In an apparatus of the class described, in combination, a tray, cards to be carried thereby having securing means, and space bars for the tray comprising parallel bars adapted to lie in the tray, the bars having grooves formed therein to receive the securing means.

8. In an apparatus of the class described, in combination, a tray, cards to be carried thereby having securing means, space bars for the tray comprising parallel bars adapted to lie in the tray, means on the bars to engage the securing means, and the bars having means thereon to effect their removal.

9. In an apparatus of the class described, in combination, a tray, cards to be carried thereby having securing means, space bars for the tray comprising parallel bars adapted to lie in the tray, the bars having means thereon to engage the securing means, and having cutaway portions at one end thereof to enable them to be grasped readily.

10. In an apparatus of the class described, in combination, a tray, cards to be carried thereby having securing means, space bars for the tray comprising parallel bars adapted to lie in the tray, the bars having means thereon to engage the securing means, and having recesses to enable them to be lifted out of the tray readily.

11. In an apparatus of the class described, a tray, means carried by the tray to secure cards, a card to be secured in the tray, a hinge member carried by the card and a longitudinally extending thickening member carried by the hinge member to form an enlarged portion on the hinge to engage certain of the securing means.

12. In an apparatus of the class described, a tray, means carried by the tray to secure cards, a card to be secured in the tray, a gummed strip folded over and engaging the card on opposite sides to form a hinge, and a cord carried in the fold of the hinge member to form a thickened portion to engage certain of the securing means.

13. In an apparatus of the class described, a tray, turned-back portions on the tray and spaced therefrom to form a channel, beads on the under side of the turned-back portions, space bars carried by the tray and held under the turned-back portions and means on the bars engaging the beads to limit the lateral movements of the bars.

14. In an apparatus of the character described, a tray, rigid securing bars in the tray and formed with grooves, cards for the tray, flexible hinges on the cards, said bars being formed with recesses to receive the hinges and guide the latter into the grooves.

15. In an apparatus of the character described, a tray, inwardly extending flanges formed on the tray at the sides thereof and spaced from the bottom thereof, rigid bars carried by the tray, the ends of the bars lying under the respective flanges and movable transversely of the tray, means intermediate the ends of the bars and intermediate the sides of the tray, and between the bars and tray to cause one end to be tilted out of the tray when a bar is moved transversely, and means to carry cards removably by the bars.

This specification signed this 4th day of August, 1927.

ROLAND A. FURLONG.